United States Patent
Wachi (10) Patent No.: US 9,979,864 B2
(45) Date of Patent: May 22, 2018

(54) IMAGE PROCESSING APPARATUS, IMAGE PICKUP APPARATUS, AND STORAGE MEDIUM FOR STORING IMAGE PROCESSING PROGRAM

(71) Applicant: CANON KABUSHIKI KAISHA, Tokyo (JP)

(72) Inventor: Fumihito Wachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 15/098,468

(22) Filed: Apr. 14, 2016

(65) Prior Publication Data

US 2016/0316111 A1 Oct. 27, 2016

(30) Foreign Application Priority Data

Apr. 22, 2015 (JP) .................. 2015-087617

(51) Int. Cl.
| | |
|---|---|
| *H04N 5/21* | (2006.01) |
| *H04N 5/217* | (2011.01) |
| *H04N 5/374* | (2011.01) |
| *H04N 5/235* | (2006.01) |
| *G06K 9/20* | (2006.01) |

(52) U.S. Cl.
CPC ........... *H04N 5/2176* (2013.01); *G06K 9/209* (2013.01); *H04N 5/2353* (2013.01); *H04N 5/374* (2013.01)

(58) Field of Classification Search
CPC .................................................. H04N 5/2176
USPC ......................................................... 348/251
See application file for complete search history.

(56) References Cited

U.S. PATENT DOCUMENTS

| | | | |
|---|---|---|---|
| 8,654,228 B2 | 2/2014 | Isaka et al. | |
| 8,797,433 B2 | 8/2014 | Kaizu et al. | |
| 2010/0001071 A1* | 1/2010 | Ohara ................. | G02B 7/021 |
| | | | 235/454 |
| 2011/0228163 A1* | 9/2011 | Isaka .................. | G03B 9/36 |
| | | | 348/362 |
| 2012/0218426 A1 | 8/2012 | Kaizu et al. | |
| 2014/0340550 A1 | 11/2014 | Kaizu et al. | |

FOREIGN PATENT DOCUMENTS

| | | |
|---|---|---|
| JP | 2011-217368 A | 10/2011 |
| JP | 2012-175621 A | 9/2012 |

* cited by examiner

*Primary Examiner* — Joel Fosselman
(74) *Attorney, Agent, or Firm* — Fitzpatrick, Cella, Harper & Scinto (57) ABSTRACT

An image processing apparatus includes an image acquirer configured to acquire an input image generated by an image pickup apparatus that controls exposure of an image sensor with a light flux from an image pickup optical system using a shutter, and a processor configured to perform image restoration processing for the input image using an image restoration filter generated based on an optical transmission function from the image pickup optical system to the image sensor in the exposure. When one of a front curtain and a back curtain in the shutter is an electronic curtain and the other is a mechanical curtain, the processor uses, for the image restoration filter, a first image restoration filter generated based on the optical transmission function in a state where the mechanical curtain partially shields the light flux from the image pickup optical system to the image sensor.

20 Claims, 6 Drawing Sheets

IMAGE PROCESSING APPARATUS, IMAGE PICKUP APPARATUS, AND STORAGE MEDIUM FOR STORING IMAGE PROCESSING PROGRAM

BACKGROUND OF THE INVENTION

Field of the Invention

The present invention relates to an image processing technology for applying image restoration processing to deteriorated image generated by an image pickup apparatus.

Description of the Related Art

A rolling shutter is an electronic shutter system for use with an image pickup apparatus, such as a digital camera, that has an image sensor, such as a CMOS sensor. The rolling shutter sequentially controls a start and end of exposure for each pixel row on an image sensor from a pixel row of one end (front pixel row) to a pixel row of the other end (last pixel row). In the pixel row at which signal reading is completed for one frame, electric charging (exposure) is immediately started for the next frame. Thus, when the signal reading for each pixel row and the next electric charging are continuously repeated, the exposure start time and exposure end time shift between the front pixel row and the last pixel row. In other words, the exposure timing shifts. This shift causes a distortion (rolling shutter distortion) in a captured image in capturing a moving object.

Japanese Patent Laid-Open No. ("JP") 2012-175621 discloses an image processing method for restraining the rolling shutter distortion in the captured image, which would be otherwise caused by the operation of the rolling shutter on the image sensor that provides the rolling shutter operation.

A focal-plane shutter is a mechanical shutter. The focal-plane shutter controls the exposure of the image sensor by moving a preceding light shield (front curtain) and a following light shield (back curtain) parallel to the image plane of the image sensor. Moreover, instead of the mechanical front curtain of the focal-plane shutter, an electronic front curtain can be used to sequentially reset stored electric charges in the image sensor for each pixel row. When the electronic front curtain is used, only a mechanical back curtain is actually driven, and the exposure time periods for all pixel rows can be maintained constant by controlling the resetting timing of electric chargers for each pixel row in the image sensor in accordance with the driving characteristic of the mechanical back curtain. Nevertheless, the electronic front curtain on the image sensor and the mechanical back curtain are distant from each other in the optical axis direction, and thus a light shield position changes on the image sensor by the mechanical back curtain due to influence of the focal length and exit pupil distance of the image pickup optical system, etc. Thus, uneven brightness in a captured image or an uneven exposure amount on an image sensor is inevitable by simply synchronizing the resetting timings of the electric charges of the electronic front curtain with the driving characteristic of the mechanical back curtain.

JP 2011-217368 discloses an image pickup method for reducing the uneven brightness in the captured image that could be otherwise caused by the electronic front curtain. The positional difference between the above electronic front curtain and the mechanical back curtain in the optical axis direction also causes other problems in addition to the uneven brightness. When the electronic front curtain and the mechanical back curtain are being driven, a partial (uneven) light shield occurs in which an F-number light flux is not shielded by the electronic front curtain but shielded by the mechanical back curtain. Thereby, an exposure time period of the image sensor by a ray on the electronic front curtain side in the F-number light flux becomes longer than an exposure time period of a ray on the mechanical back curtain side. This means that an optical transmission function (OTF) (or optical aberration) from the image pickup optical system to the image sensor changes in the image pickup (exposure) necessary for one captured image. Then, the image deterioration state also changes due to the change of the OTF in the image pickup.

Those methods disclosed in JPs 2012-175621 and 2011-217368 can restrain the rolling shutter distortion or reduce the uneven brightness in the captured image caused by the electronic front curtain. However, these methods cannot properly correct the image deterioration caused by the partial light shield by the mechanical back shutter when the electronic front curtain and the mechanical back curtain are used.

SUMMARY OF THE INVENTION

The present invention provides an image processing apparatus that can provide an output image by well correcting an image deterioration caused by partial light shield by a mechanical back curtain when an electronic front curtain and the mechanical back curtain are used.

An image processing apparatus according to one aspect of the present invention includes an image acquirer configured to acquire an input image generated by an image pickup apparatus that controls exposure of an image sensor with a light flux from an image pickup optical system using a shutter, and a processor configured to perform image restoration processing for the input image using an image restoration filter generated based on an optical transmission function from the image pickup optical system to the image sensor in the exposure. When one of a front curtain and a back curtain in the shutter is an electronic curtain and the other is a mechanical curtain, the processor uses, for the image restoration filter, a first image restoration filter generated based on the optical transmission function in a state where the mechanical curtain partially shields the light flux from the image pickup optical system to the image sensor.

Further features of the present invention will become apparent from the following description of exemplary embodiments with reference to the attached drawings.

DESCRIPTION OF THE EMBODIMENTS

Referring now to the accompanying drawings, a description will now be given of embodiments of the present invention.

First Embodiment

Figure 1:
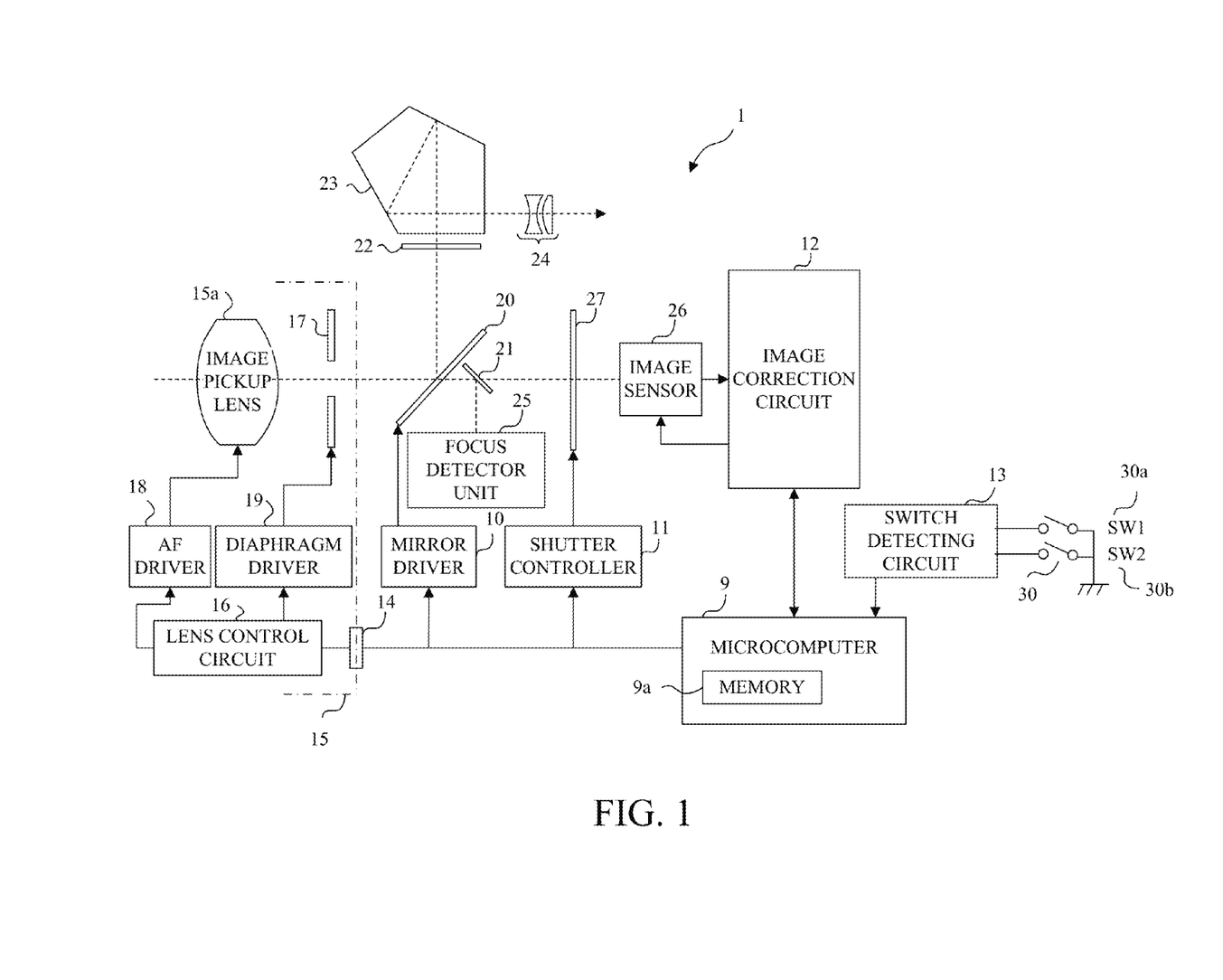
FIG. 1 is a view illustrating a structure of an image pickup apparatus according to a first embodiment of the present invention.

FIG. 1 is a digital single-lens reflex camera (referred to as a "camera" hereinafter) 1 as an image pickup optical system according to a first embodiment of the present invention, and an interchangeable lens unit 15 that is attached detachably to the camera 1.

A camera microcomputer 9 provided in the camera 1 instructs a variety of operations and processes to each electric component in the camera and to control all operations in the camera 1. The camera microcomputer 9 has a built-in memory 9a. The memory 9a stores information relating to an optical transmission function ("OTF") from an image pickup lens (image pickup optical system) 15a, which will be described later, to an image sensor 26 or image correcting information generated based on the information relating to the OTF. The memory 9a also stores a variety of set values relating to image pickup, and parameters necessary for the operations of the camera 1.

The camera microcomputer 9 is connected to a mirror driver 10, a shutter controller 11, an image correction circuit 12, and a switch detecting circuit 13, and each component communicates with the camera microcomputer 9 and receives and transmits information for operations.

The camera microcomputer 9 communicates with a lens microcomputer 16 in the interchangeable lens unit 15 via a mount contact 14. The lens microcomputer 16 controls focusing driving of the image pickup lens 15a and driving of a diaphragm 17 through an AF driver 18 and a diaphragm driver 19 according to the focus driving command and the diaphragm driving command from the camera microcomputer 9. FIG. 1 illustrates the diaphragm 17 in addition to the image pickup lens 15a, but the diaphragm 17 is part of the image pickup lens 15a.

The camera 1 has a main mirror 20 and a sub-mirror 21 that can be inserted into or retreated from an optical path from the image pickup lens 15a, which will be referred to as an "image pickup optical path" hereinafter. The main mirror 20 and the sub-mirror 21 are driven by a mirror driver 10 including an actuator according to a mirror control signal from the camera microcomputer 9.

When the main mirror 20 is located in the image pickup optical path (referred to as an "optical viewfinder state" hereinafter), the main mirror 20 reflects part of a light flux from the image pickup lens 15a or a light flux from the object and forms an object image on a focus plate 22. The object image on the focus plane 22 is observed by a photographer that views an eyepiece 24 via a penta-prism 23 and an eyepiece 24. The sub-mirror 21 reflects the light flux that has transmitted through the main mirror 20 in the optical viewfinder, and guides the light flux to a focus detecting unit 25. In the image pickup, the main mirror 20 and the sub-mirror 21 are retreated from the image pickup optical path, and allow the light flux from the image pickup lens 15a to go to a focal-plane shutter 27 and the image sensor 26.

The focal-plane shutter 27 has light shields, such as a mechanical front curtain and a mechanical back curtain that move back and forth relative to the image pickup optical path to the image sensor 26. The mechanical front curtain closes in the optical viewfinder state, and shields the incident light flux from the image pickup optical path. The mechanical front curtain moves so as to retreat from the image pickup optical path according to a release control signal from the camera microcomputer 9 in the image pickup, and starts exposing the image sensor 26. The mechanical back curtain moves later so as to form a slit with the mechanical front curtain. Thereby, the exposure of the image sensor 26 is controlled. The image sensor 26 can serve as the electronic front curtain, and in this case the electronic front curtain and the mechanical back curtain form a shutter configured to control exposure of the image sensor 26 (referred to as an "electronic front curtain/mechanical back curtain shutter" hereinafter).

The image sensor 26 can use a two-dimensional image pickup device, such as a CMOS sensor.

The image correction circuit 12 converts a captured signal as an analogue signal read out of the image sensor 26 into a digital captured signal through an unillustrated A/D converter. An output image (monitor displayed image and recorded image) is generated by performing gamma/knee processing, filtering, monitor displayed information synthesizing, and image restoring, which will be described later. The image correction circuit 12 corresponds to an image processing apparatus. The image correction circuit 12 may be provided on the same substrate as the camera microcomputer 9. The camera microcomputer 9 may read a program code stored in the memory 9a, perform calculation processing according to the program code, and execute all or part of functions of the image correction circuit 12.

The switch detecting circuit 13 outputs an operating signal according to an operating state of each switch provided to the camera 1. The switch SW1 (30a) outputs a SW1 signal according to a first stroke (half-pressing) of the shutter button 30. The switch SW2 (30b) outputs a SW2 signal according to a second stroke (full pressing) of the shutter button 30. The camera microcomputer 9 starts image pickup preparation processing, such as the AF and photometry, according to the SW1 signal, and image pickup processing (or generating of recorded image) according to the SW2 signal.

A description will now be given of a basic configuration of the image restoration processing performed by the image correction circuit 12. An image obtained by capturing an object with an image pickup apparatus, such as a digital camera, contains a blur component as an image deteriorating component caused by optical aberrations of an image pickup optical system, such as a spherical aberration, a coma, a curvature of field, and an astigmatism. This blur component occurs when a light flux emitted from one point on the object forms an image with a certain spread although the light flux is to be converged again at one point on the image pickup plane, when there are no aberrations and no influence of diffractions.

The blur component, as used herein, is optically expressed by a point spread function ("PSF"), and different from a blur caused by defocus. The color fringing in a colored image can be considered to be a blur difference for each wavelength of the light if it is caused by a longitudinal chromatic aberration of the optical system, a color spherical aberration, and a color coma. A color shift in a meridional direction (lateral direction) can be considered to be a positional shift or phase shift caused by a difference of an image pickup magnification for each wavelength of the light, if it is caused by a lateral chromatic aberration of the optical system.

The optical transfer function ("OTF") obtained by Fourier-transforming the PSF expresses frequency component information of the aberration, and is expressed by a complex number. An absolute value of the OTF or an amplitude component is referred to as a modulation transfer function ("MTF") and its phase component is referred to as a phase transfer function ("PTF"). The MTF and PTF are frequency characteristics of the amplitude component and the phase component of the image deterioration caused by the aberration. Herein, the phase angle of the phase component is expressed by the following expression, where Re(OTF) and Im(OTF) are a real part and an imaginary part of the OTF.

$$PTF = \tan^{-1}(Im(OTF)/Re(OTF)) \quad (1)$$

The OTF of the optical system deteriorates the amplitude component and the phase component of the image, and each point of the object in the deteriorated image is asymmetrically blurred like the coma.

The lateral chromatic aberration occurs when an imaging position shifts due to a difference of the imaging magnification for each wavelength of the light, and is obtained for each color component, such as RGB according to the spectral characteristic of the image pickup apparatus. Therefore, the imaging positons shift among RGB and the imaging positons of the same color component shift among the wavelengths or the phases. As a result, the image has a spread. Strictly speaking, the lateral chromatic magnification is not simple parallel color shift, but is categorized as a color shift herein.

A method of using information of the OTF of the optical system is known as a method for correcting the deteriorations of the amplitude component (MTF) and the phase component (PTF) in the deteriorated image (input image). This method is referred to as an image restoration or image recovery, and this embodiment refers to processing for correcting a deteriorated image using the information of the OTF of the optical system (for making the deteriorated image close to the original image) as image restoration processing. One known method of image restoration processing is a method for convoluting an image restoring filter in a real space having a reverse characteristic of the OTF, to the input image.

The following expression is established where g(x, y) is an input image (deteriorated image) generated by image pickup, f(x, y) is an original image (non-deteriorated image), h(x, y) is a PSF as a Fourier pair of the OTF, * denotes a convolution, and (x, y) is a coordinate (position) on the input image.

$$g(x, y) = h(x, y) * f(x, y) \quad (12)$$

When this expression is converted into a display format on the frequency plane, a format of a product for each frequency is established like the following expression. H is a Fourier transform of (PSF)h and corresponds to the OTF. G and F are Fourier transforms of g and f, respectively. (u, v) denotes a coordinate on a two-dimensional frequency plane or a frequency.

$$G(u, v) = H(u, v) \cdot F(u, v) \quad (13)$$

In order to obtain the original image from the deteriorated image generated by the image pickup apparatus, both sides in the above expression may be divided by H as follows.

$$G(u, v)/H(u, v) = F(u, v) \quad (14)$$

The restored image as the original image f(x, y) can be obtained by inversely Fourier-transforming F(u, v) or G(u, v)/H(u, v) so as to return it to the real surface.

If it is assumed that $H^{-1}$ denotes an inverse Fourier transform of R, the restored image as the original image f(x, y) can be obtained by the convolution processing to the image in the real surface.

$$g(x, t) * R(x, y) = f(x, y) \quad (15)$$

R (x, y) is an image restoration filter. When the input image is two-dimensional, the image restoration filter generally becomes a two-dimensional filter having a tap (cell) corresponding to each pixel in the two-dimensional image.

The actual image has a noise component. When the image restoration filter produced by a perfect reciprocal of the OTF is used, the noise component is amplified with the deteriorated image and a good image cannot generally be obtained. Herein, for example, there is known a method for restraining a restoration ratio on a high frequency band of an image according to an intensity ratio between the image signal and the noise signal like a Weiner filter. For example, a correction of the above blur component may serve as a method for correcting a deterioration of a color fringing component in an image, if blur amounts become uniform among color components in the image.

Since the OTF changes according to the condition of the image pickup optical system (also referred to as a "lens condition" hereinafter), such as a zoom state in the optical system (lens), an aperture value (F-number), an image pickup distance, etc., it is necessary to change the image restoration filter used for the image restoration processing accordingly.

When the electronic front curtain/mechanical back curtain shutter is used as in the camera 1 according to this embodiment, the image is deteriorated by irregular shields of the light fluxes to the image sensor or changes of the PSF, as described later. However, the image processing disclosed in JPs 2012-175621 and 2011-217368 used to correct the rolling shutter distortion and the uneven brightness cannot correct this image deterioration.

Figure 2:
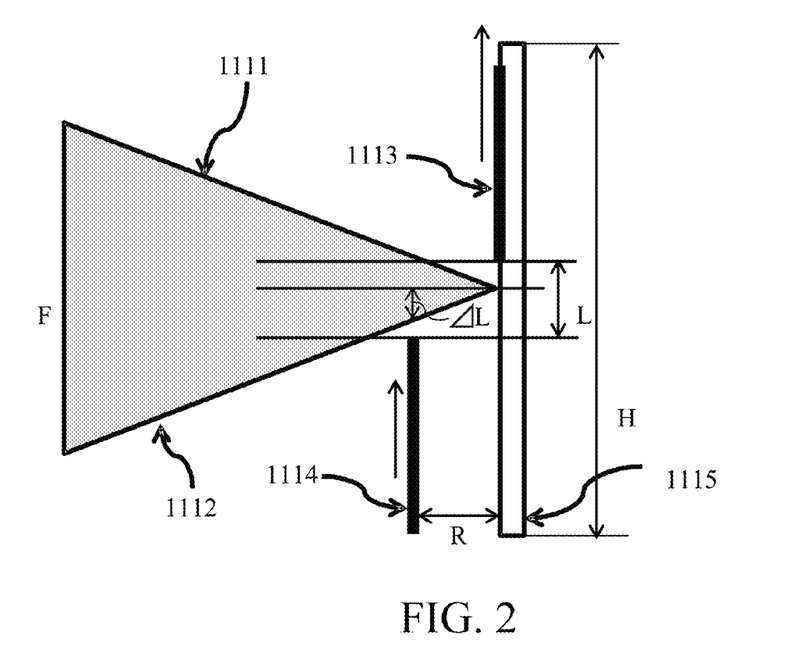
FIG. 2 is a view for explaining a shutter operation when an electronic front curtain and a mechanical back curtain are used in the image pickup apparatus according to the first embodiment.

FIG. 2 illustrates the structure of the electronic front curtain/mechanical back curtain shutter and the F-number light flux according to this embodiment. More specifically, FIG. 2 illustrates a shutter including an electronic front curtain 1113 and a mechanical back curtain 1114, an image sensor 1115 (corresponding to reference numeral 26 in FIG. 1), and a top ray 1111 and a bottom ray 1112 of the F-number light flux. In the following description, the optical axis of the image pickup lens 15a illustrated in FIG. 1 is referred to as an image pickup optical axis and a direction in which the image pickup optical axis extends is referred to as an image pickup optical direction.

Herein, S denotes a curtain velocity of the electronic front curtain 1113 and the mechanical back curtain 1114, Tv denotes a shutter velocity, and H is a length of the image sensor 1115 in the curtain moving direction. Then, a slit width L formed between the electronic front curtain 1113 and the mechanical back curtain 1114 is expressed as follows:

Expression 1

$$L = \frac{Tv}{S} H \quad (1)$$

Assume that R is a distance between the image sensor 1115 and the mechanical back curtain 1114 in the image pickup optical axis direction, and F is an F-number of the image pickup lens 15a. Then, a height ΔL between an axial ray of the F-number light flux (ray on the image pickup optical axis) and the bottom ray 1112 of the F-number light flux at a position of the mechanical back curtain 1114 in the image pickup optical direction may be expressed as follows:

Expression 2

$$\Delta L = R\tan\theta = R\tan\left(\sin^{-1}\left(\frac{1}{2F}\right)\right) \quad (2)$$

An exposure time period Tu of the image sensor 1115 by the top ray 1111 of the F-number light flux is expressed as follows:

Expression 3

$$Tu = \frac{S(L + \Delta L)}{H} \quad (3)$$

An exposure time period Td of the image sensor 1115 by the bottom ray 1112 of the F-number light flux is expressed as follows:

Expression 4

$$Td = \frac{S(L + \Delta L)}{H} \quad (4)$$

Figure 3:
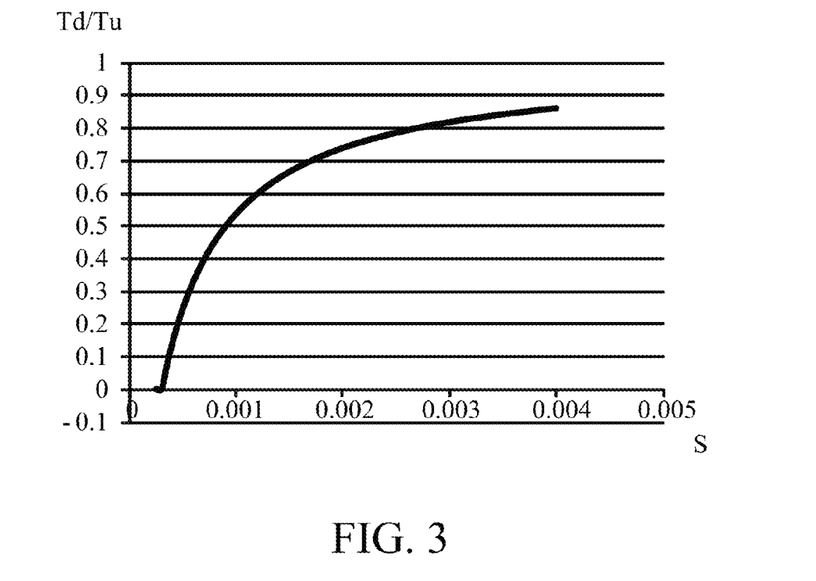
FIG. 3 is a graph illustrating a relationship between an exposure amount and velocities of the electronic front curtain and mechanical back curtain according to the first embodiment.

A description will now be given of a ratio Td/Tu of the exposure time period between the top ray 1111 and the bottom ray 1112. The exposure time periods of the top ray 1111 and the bottom ray 1112 are calculated based on the Expressions (3) and (4). FIG. 3 illustrates the ratio Td/Tu between Tu and Td where the shutter velocity Tv is 1/4000 seconds and the F-number F is 1.2. The ordinate axis in this graph is Td/Tu, and an abscissa axis denotes the curtain velocity S. It is understood from this graph that as the curtain velocity S is lower, the ratio Td/Tu is reduced. In other words, as the curtain velocity S becomes lower, a difference between the exposure time periods Tu and Td of the top ray 1111 and the bottom ray 1112 increases, and the influence on the captured image by the partial shield of the mechanical back curtain 1114 of the F-number light flux increases.

Figure 4A:
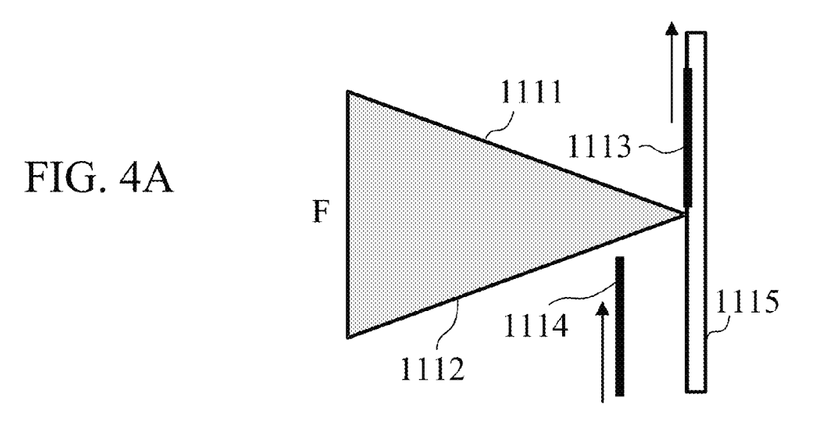
FIGS. 4A to 4C are views for explaining changes of a light shield in the shutter operation.
Figure 4B:
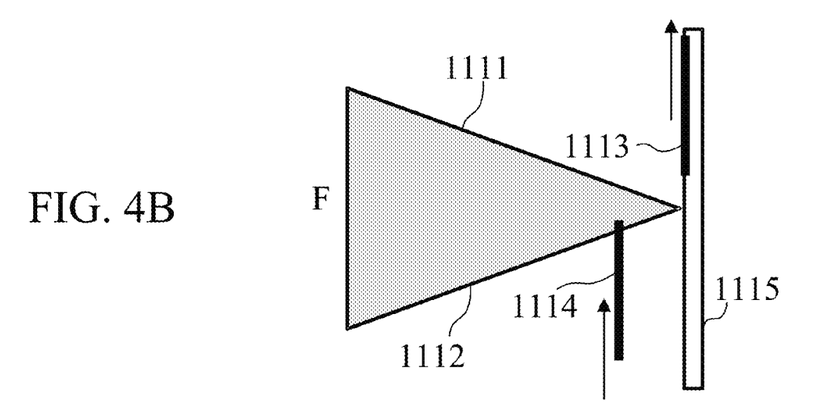
Figure 4C:
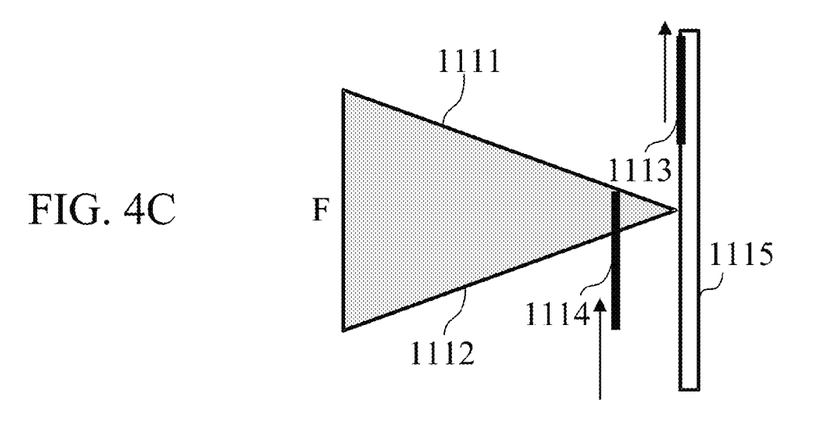
Figure 7A:
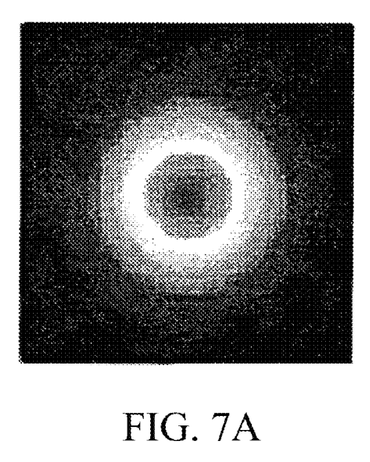
FIGS. 7A and 7B are normal point spread function ("PSF") and partial shield PSF.

A description will now be given of changing of the exposure time periods Tu and Td by the top ray 1111 and the bottom ray 1112. FIGS. 4A to 4C illustrate the relationship between the operation of the electronic front curtain/mechanical back curtain shutter and the F-number light flux. FIG. 4A illustrates the above relationship at the timing when the electronic front curtain 1113 stops shielding the F-number light flux and starts exposing the image sensor 1115. At this timing, a slit is formed that passes light for exposing the image sensor 1115 between the electronic front curtain 1113 and the mechanical back curtain 1114. None of the top ray 1111 and the bottom ray 1112 of the F-number light flux is shielded. FIG. 7A illustrates an illustrative PSF of the image pickup lens 15a.

FIG. 4B illustrates the above relationship at the timing when a certain time period elapses from FIG. 4A and the mechanical back curtain 1114 starts shielding the F-number light flux. Similar to the timing of FIG. 4A, the slit that passes the light for exposing the image sensor 1115 is formed between the electronic front curtain 1113 and the mechanical back curtain 1114. A width (height) of the slit is the same as that of FIG. 4A. Since the mechanical back curtain 1114 starts shielding the bottom ray 1112 of the F-number light flux at the timing of FIG. 4B, the PSF shape in the F-number light flux is different from the PSF shape at the timing in FIG. 4A.

Figure 7B:
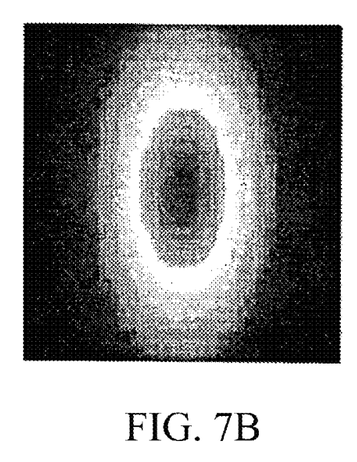

FIG. 4C illustrates the above relationship after a certain time period elapses from FIG. 4B at the timing just before the mechanical back curtain 1114 completely shields the F-number light flux. Similar to FIGS. 4A and 4B, the slit that passes the light for exposing the image sensor 1115 is formed between the electronic front curtain 1113 and the mechanical back curtain 1114. A width (height) of the slit is the same as those of FIGS. 4A and 4B. Since the mechanical back curtain 1114 almost shields the bottom ray 1112 of the F-number light flux in the state illustrated in FIG. 4C, the PSF shape in the F-number light flux is significantly different from the PSF shape of FIG. 4A or the PSF shape in the state of FIG. 4B. FIG. 7B illustrates an illustrative PSF in the state of FIG. 4C at a certain shutter velocity and the F-number. The PSF illustrated in FIG. 7B is significantly deformed from that illustrated in FIG. 7A.

As a consequence, even when the image restoration filter prepared from the PSF in the state of FIG. 4A in which the F-number light flux is not shielded is applied to the deteriorated image obtained in the state of FIG. 4C in which the F-number light flux is almost shielded, a good result of the image restoration processing cannot be obtained.

Figure 5:
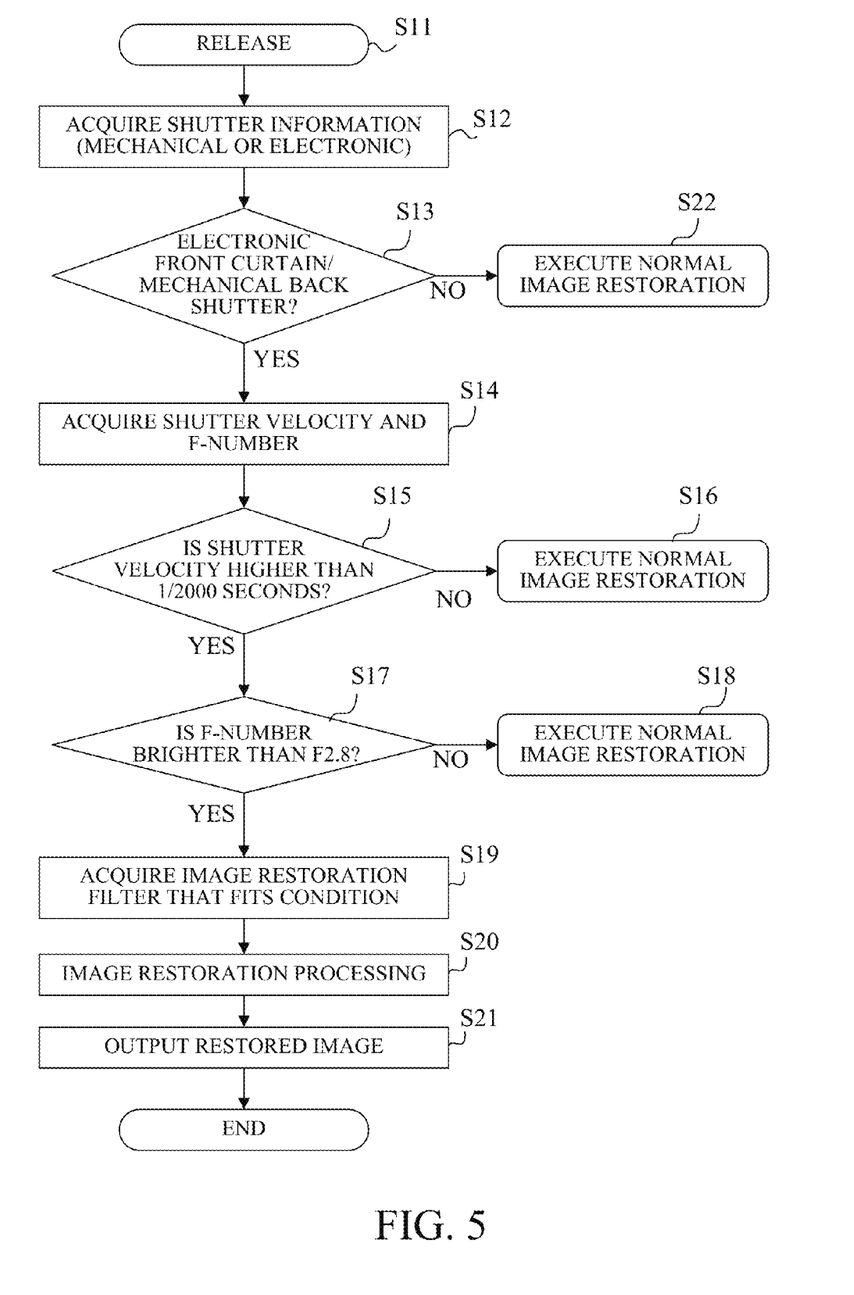
FIG. 5 is a flowchart illustrating image restoration processing according to the first embodiment.

Referring now to FIG. 5, a description will be given of the image restoration processing performed by the image correction circuit 12 according to this embodiment, which can handle a change of the PSF when the electronic front curtain/mechanical back curtain shutter is used. This processing is executed by the image correction circuit 12 as a computer according to the image restoration program as a computer program. The image correction circuit 12 serves as an image acquiring unit, a filter acquiring unit, and a processing unit.

In step S11, the image correction circuit 12 detects the image pickup (exposure) based on the release control signal. In step S12, the image correction circuit 12 obtains a captured image as an input image. In addition, the image correction circuit 12 obtains information of the shutter used for the image pickup (referred to as "actual shutter information" hereinafter) from the camera microcomputer 9. The actual shutter information represents the focal-plane shutter using the mechanical front curtain and the mechanical back curtain or the electronic front curtain/mechanical back curtain shutter. Moreover, the image correction circuit 12 obtains information of the lens condition, such as a zoom state, an F-number, and an image pickup distance of the image pickup lens 15a for the image pickup from the camera microcomputer 9.

Next, in step S13, the image correction circuit 12 determines whether or not the actual shutter information represents the electronic front curtain/mechanical back curtain shutter. If so, the flow moves to step S14, and if not, the flow moves to step S22.

In step S14, the image correction circuit 12 obtains the shutter velocity and the F number set in the image pickup from the camera microcomputer 9.

In step S15, the image correction circuit 12 determines whether or not the shutter velocity obtained in the step S14 is higher than a predetermined shutter velocity, such as 1/2000 seconds. When the shutter velocity is higher than the predetermined shutter velocity, the flow moves to S17, and when the shutter velocity is equal to or lower than the predetermined shutter velocity, the flow moves to step S16.

In the step S17, the image correction circuit 12 determines whether or not the F-number obtained in the step S14 is brighter than a predetermined F-number, such as F2.8. When it is brighter than the predetermined F-number, the flow moves to the step S19, and when it is equal to or darker than the predetermined F-number, the flow moves to step S18.

The memory 9a in the camera microcomputer 9 illustrated in FIG. 1 stores information of two types of PSFs as information relating to the above OTF. The first type of PSF is a PSF that is selectable irrespective of whether or not the electronic front curtain/mechanical back curtain shutter is used, and includes a plurality of PSFs that change according to a plurality of lens conditions, such as a zoom state, an F-number, and an image pickup distance. The first type of PSF is the PSF in the state in FIG. 4A, and will be referred to as a "normal PSF" hereinafter.

The second type of PSF includes a plurality of PSFs corresponding to a combination of a plurality of shutter velocities and a plurality of F-numbers when the electronic front curtain/mechanical back curtain shutter is used. In other words, it includes the PSFs that correspond to the OTF from the image pickup lens 15a to the image sensor 26 through the electronic front curtain/mechanical back curtain shutter and change according to the shutter velocity and the F-number. The second type of PSF also includes a plurality of PSFs that change according to the above plurality of lens conditions other than the F-number. The second type of PSF is a PSF, which will be referred to as a "partial shield PSF" hereinafter, corresponding to a state in which part of the F-number light flux is shielded by the mechanical back curtain as illustrated in FIG. 4C.

In step S19, the image correction circuit 12 selects a PSF corresponding to the shutter velocity and the F-number obtained in the step S14 among the plurality of partial shield PSFs stored in the memory 9a, and produces a (first) image restoration filter based on the selected PSF, which will be referred to as a partial shield image restoration filter.

In step S20, the image correction circuit 12 that has obtained (generated) the partial shield image restoration filter provides image restoration processing to the captured image (deteriorated image) using the obtained partial shield image restoration filter, and generates a restored image.

In step S21, the image correction circuit 12 displays a generated restored image on the color liquid crystal display unit 29 or records the restored image in an unillustrated recording medium.

In each of the steps S22, S16, and S18, the image correction circuit 12 selects the normal PSF corresponding to the lens condition in the image pickup among the plurality of normal PSFs stored in the memory 9a, and produces a (second) image restoration filter based on this selected normal PSF, which will be referred to as a normal image restoration filter. Moreover, the image correction circuit 12 generates a restored image by performing the normal image restoration processing to the captured image (deteriorated image) using this normal image restoration filter, and displays the restored image on the color liquid crystal display unit 29 or records it in the recording medium.

The memory 9a may store, as the above image correcting information, the plurality of normal image restoration filter and the plurality of partial shield image restoration filters previously prepared based on the plurality of normal PSFs and the plurality of partial shield PSFs, respectively. In this case, in the step S19, the image correction circuit 12 selects the partial shield image restoration filter in the memory 9a corresponding to the shutter velocity and the F-number obtained in the step S14. In addition, in the steps S16 and S18, the image correction circuit 12 selects the normal image restoration filter corresponding to the lens condition in the image pickup from the memory 9a.

As described, this embodiment can obtain a good restored image by applying the image restoration processing using the proper image restoration filter to the image deteriorated by the partial shield of the light flux by the mechanical back curtain when the electronic front curtain and the mechanical back curtain are used.

1/2000 seconds as the predetermined shutter velocity and the F2.8 as the predetermined F-number are merely illustrative, and the predetermined shutter velocity may be equal to or higher than 1/4000 seconds and the predetermined F-number may be equal to or lower than F1.4. When this condition is satisfied, the influence on the captured image by the partial shield by the mechanical back curtain increases, and thus the image restoration filter necessary for the image restoration processing is significantly different from the normal image restoration filter applied to the captured image that is not subject to the partial shield. Hence, the image restoration processing described in this embodiment becomes more effective. In addition, when the above predetermined condition is satisfied, the image restoration filter is selected according to whether the electronic front curtain and the mechanical back curtain are used or whether both the front and back curtains are electronic or mechanical.

While this embodiment describes that whether the normal image restoration filter or the partial shield image restoration filter is used for the image restoration processing is determined based on the shutter velocity and the F-number. However, whether the normal image restoration filter or the partial shield image restoration filter is used may be selected according to one of the shutter velocity and the F-number.

Second Embodiment

Figure 6:
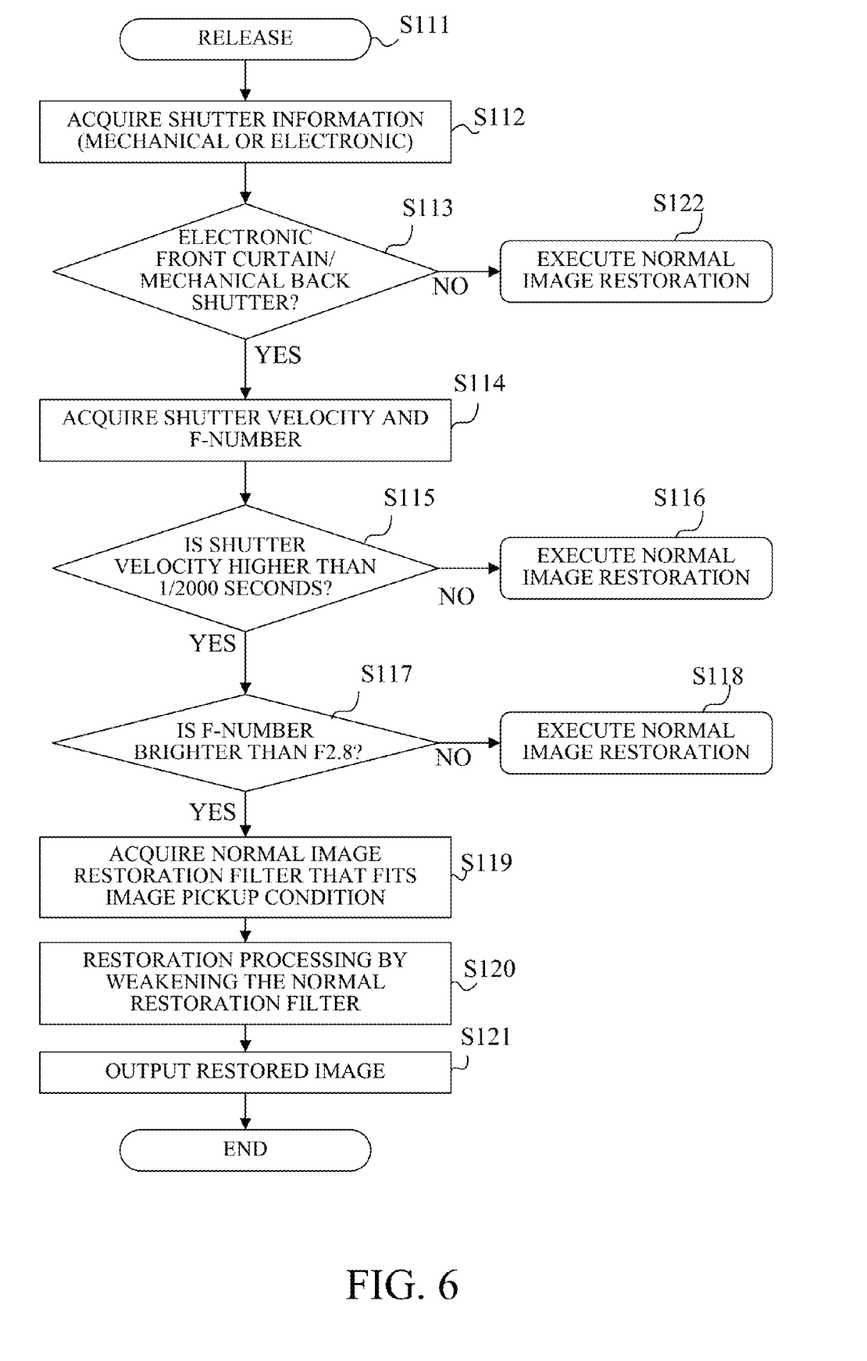
FIG. 6 is a flowchart illustrating image restoration processing according to a second embodiment of the present invention.

A flowchart in FIG. 6 illustrates image restoration processing according to a second embodiment of the present invention. The first embodiment describes the image restoration processing using the partial shield image restoration filter different from the normal image restoration filter when the shutter velocity is high and the F-number is bright in the image pickup (exposure). On the other hand, this embodiment changes the image restoration intensity of the image restoration processing used for the normal image restoration filter according to the shutter velocity (and F-number) in the image pickup.

This embodiment stores, as the information relating to the OTF, information of the normal PSF corresponding to the plurality of lens conditions explained in the first embodiment, in the memory 9a illustrated in FIG. 1.

Processing from S111 to S118 and S122 correspond to the processing from S11 to S18 and S22 in the first embodiment (FIG. 5), and a description thereof will be omitted.

When determining that the shutter velocity in the image pickup is higher than the predetermined shutter velocity (S115) and the F-number is brighter than the predetermined F-number (S117), the image correction circuit 12 selects the normal PSF corresponding to the lens condition in the image pickup from the memory 9a in step S119. Then, the image correction circuit 12 prepares the normal image restoration filter from the selected normal PSF.

Next, in step S120, the image correction circuit 12 generates the restored image by applying the image restoration processing to the captured image (deteriorated image) using the normal image restoration filter produced in the step S119. The image correction circuit 12 weakens the image restoration intensity in the image restoration processing in comparison with the normal image restoration processing performed in the steps S116 and S118. More specifically, a maximum value of a reciprocal of the OTF into which the PSF is Fourier-transformed is calculated, and the reciprocal of the OTF is multiplied by the gain so as to reduce the maximum value of the reciprocal of this OTF. Then, the reciprocal of the OTF multiplied by the gain is inversely Fourier-transformed to the real surface, and the image restoration filter that weakens the image restoration intensity can be obtained.

In step S121, the image correction circuit 12 displays the generated restored image on the color liquid crystal display unit 29 or records it in the recording medium.

The memory 9a may store, as the image correcting information, the plurality of normal image restoration filters previously prepared based on the plurality of normal PSFs. In this case, in the step S119, the image correction circuit 12 selects the normal image restoration filter corresponding to the shutter velocity and the F-number obtained in the step S114 from the memory 9a.

As described above, this embodiment provides image restoration processing to the deteriorated image influenced by the partial shield of the light flux by the mechanical back curtain when the electronic front curtain and the mechanical back curtain are used, by weakening the image restoration intensity in comparison with the normal image restoration processing. Thus, this embodiment can avoid generating the restored image that is not good by the strong image restoration using the normal image restoration processing and can obtain the image restoration effect to some extent.

While this embodiment describes a change of the image restoration intensity according to both the shutter velocity and the F-number, the image restoration intensity may be changed according to one of the shutter velocity and the F-number.

While the first and second embodiments describe the image restoration processing when the electronic front curtain and the mechanical back curtain are used, a combination of the mechanical front curtain and the electronic back curtain may be used. Even in this case, a similar problem occurs as in a case where the electronic front curtain and the mechanical back curtain are used, and the good restored image can be obtained by applying the similar image restoration processing. In other words, one of the front and back curtains may be an electronic curtain and the other may be a mechanical curtain.

While the first and second embodiments describe that the image correction circuit 12 in the camera 1 serves as the image processing apparatus, a personal computer other than the camera 1 may be configured as an image processing apparatus. In this case, the personal computer may perform the image restoration processing illustrated in FIGS. 5 and 6 for the captured image (input image) obtained from the camera 1 according to the image processing program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087617, filed Apr. 22, 2015, which is hereby incorporated by reference herein in its entirety.

What is claimed is:

1. An image processing apparatus comprising:
an image acquirer configured to acquire an input image generated by an image pickup apparatus that controls exposure of an image sensor with a light flux from an image pickup optical system using a shutter; and
a processor configured to perform image restoration processing for the input image using an image restoration filter generated based on an optical transmission function from the image pickup optical system to the image sensor in the exposure,
wherein when one of a front curtain and a back curtain in the shutter is an electronic curtain and the other is a mechanical curtain, the processor uses, for the image restoration filter, a first image restoration filter generated based on the optical transmission function in a state where the mechanical curtain partially shields the light flux from the image pickup optical system to the image sensor.

2. The image processing apparatus according to claim 1, wherein the processor selects for the image restoration filter, the first image restoration filter or a second image restoration filter generated based on the optical transmission function in a state where the mechanical curtain does not shield the light flux, according to a shutter speed of the shutter in the exposure.

3. The image processing apparatus according to claim 2, wherein the processor uses the first image restoration filter when the shutter speed is higher than a predetermined shutter speed, and the second image restoration filter when the shutter speed is equal to or lower than the predetermined shutter speed.

4. The image processing apparatus according to claim 1, wherein the processor selects for the image restoration filter, the first image restoration filter or a second image restoration filter generated based on the optical transmission function in a state where the mechanical curtain does not shield the light flux, according to an F-number of the image pickup optical system in the exposure.

5. The image processing apparatus according to claim 4, wherein the processor uses the first image restoration filter when the F-number is smaller than a predetermined F-number, and the second image restoration filter when the F-number is equal to or larger than the predetermined F-number.

6. The image processing apparatus according to claim 1, wherein the processor selects for the image restoration filter, the first image restoration filter or a second image restoration filter generated based on the optical transmission function in a state where the mechanical curtain does not shield the light flux, according to a shutter speed of the shutter in the exposure and an F-number of the image pickup optical system.

7. The image processing apparatus according to claim 6, wherein the processor uses the first image restoration filter when the shutter speed is higher than a predetermined shutter speed and the F-number is smaller than a predetermined F-number, and the second image restoration filter when the shutter speed is equal to or lower than the predetermined shutter speed or the F-number is equal to or larger than the predetermined F-number.

8. The image processing apparatus according to claim 1, wherein unless one of a front curtain and a back curtain in the shutter is an electronic curtain and the other is a mechanical curtain, the processor uses a second image restoration filter generated based on the optical transmission function in a state where the mechanical curtain does not shield the light flux.

9. An image processing apparatus comprising:
an image acquirer configured to acquire an input image generated by an image pickup apparatus that controls exposure of an image sensor with a light flux from an image pickup optical system using a shutter; and
a processor configured to perform image restoration processing for the input image using an image restoration filter generated based on an optical transmission function from the image pickup optical system to the image sensor in the exposure,
wherein when one of a front curtain and a back curtain in the shutter is an electronic curtain and the other is a mechanical curtain, the processor changes an image restoration intensity in the image restoration processing according to at least one of a shutter speed of the shutter and an F-number of the image pickup optical system in the exposure.

10. The image processing apparatus according to claim 9, wherein the processor sets the image restoration intensity when the shutter speed is higher than a predetermined shutter speed, lower than that when the shutter speed is equal to or lower than the predetermined shutter speed.

11. The image processing apparatus according to claim 9, wherein the processor sets the image restoration intensity when the F-number is smaller than a predetermined F-number, lower than that when the F-number is equal to or larger than the F-number.

12. The image processing apparatus according to claim 9, wherein the processor sets the image restoration intensity when the shutter speed is higher than a predetermined shutter speed and the F-number is smaller than a predetermined F-number, lower than that when the shutter speed is equal to or lower than the predetermined shutter speed or that when the F-number is equal to or larger than the F-number.

13. An image pickup apparatus comprising:
an image sensor;
a shutter configured to control exposure of the image sensor with a light flux from an image pickup optical system; and
an image processing apparatus that includes an image acquirer configured to acquire an input image generated by an image pickup apparatus that controls exposure of using a shutter, and a processor configured to perform image restoring processing for the input image using an image restoration filter generated based on an optical transmission function from the image pickup optical system to the image sensor in the exposure,
wherein when one of a front curtain and a back curtain in the shutter is an electronic curtain and the other is a mechanical curtain, the processor uses for the image restoration filter, a first image restoration filter generated based on the optical transmission function in a state where the mechanical curtain partially shields the light flux from the image pickup optical system to the image sensor.

14. An image pickup apparatus comprising:
an image sensor;
a shutter configured to control exposure of the image sensor with a light flux from an image pickup optical system; and
an image processing apparatus that includes an image acquirer configured to acquire an input image generated by an image pickup apparatus that controls exposure of using a shutter, and a processor configured to perform image restoring processing for the input image using an image restoration filter generated based on an optical transmission function from the image pickup optical system to the image sensor in the exposure,
wherein when one of a front curtain and a back curtain in the shutter is an electronic curtain and the other is a mechanical curtain, the processor changes an image restoration intensity in the image restoration processing according to at least one of a shutter speed of the shutter and an F-number of the image pickup optical system in the exposure.

15. A non-transitory computer-readable storage medium for storing an image processing program that enables a computer to:
acquire an input image generated by an image pickup apparatus that controls exposure of an image sensor with a light flux from an image pickup optical system using a shutter; and
perform image restoration processing for the input image using an image restoration filter generated based on an optical transmission function from the image pickup optical system to the image sensor in the exposure,
wherein when one of a front curtain and a back curtain in the shutter is an electronic curtain and the other is a mechanical curtain, the computer executes the image restoration processing using for the image restoration filter, a first image restoration filter generated based on the optical transmission function in a state where the mechanical curtain partially shields a light flux from the image pickup optical system to the image sensor.

16. A non-transitory computer-readable storage medium for storing an image processing program that enables a computer to:
acquire an input image generated by an image pickup apparatus that controls exposure of an image sensor with a light flux from an image pickup optical system using a shutter; and perform image restoration processing for the input image using an image restoration filter generated based on an optical transmission function from the image pickup optical system to the image sensor in the exposure, wherein when one of a front curtain and a back curtain in the shutter is an electronic curtain and the other is a mechanical curtain, the computer executes an image restoration intensity by the image restoration processing according to at least one of a shutter speed of the shutter and an F-number of the image pickup optical system in the exposure.

17. An image processing apparatus comprising:
an image acquirer configured to acquire an input image generated by an image pickup apparatus that controls exposure of an image sensor with a light flux from an image pickup optical system using a shutter; and
a processor configured to perform image restoration processing for the input image using an image restoration filter generated based on an optical transmission function from the image pickup optical system to the image sensor in the exposure,
wherein the processor uses, for the image restoration filter, a first image restoration filter, when a predetermined condition is satisfied, and uses, for the image restoration filter, a second image restoration filter which is different from the first image restoration filter, when the predetermined condition is not satisfied, and
wherein the predetermined condition includes a condition that one of a front curtain and a back curtain in the shutter is an electronic curtain and the other is a mechanical curtain.

18. The image processing apparatus according to claim 17, wherein the predetermined condition further includes a condition that a shutter speed of the shutter in the exposure is higher than a predetermined shutter speed and/or an F-number of the image pickup optical system in the exposure is smaller than a predetermined F-number.

19. An image processing apparatus comprising:
an image acquirer configured to acquire an input image generated by an image pickup apparatus that controls exposure of an image sensor with a light flux from an image pickup optical system using a shutter; and
a processor configured to perform image restoration processing for the input image using an image restoration filter generated based on an optical transmission function from the image pickup optical system to the image sensor in the exposure,
wherein the processor weakens an image restoration intensity in the image restoration processing when a predetermined condition is satisfied compared with when the predetermined condition is not satisfied, and
wherein the predetermined condition includes a condition that one of a front curtain and a back curtain in the shutter is an electronic curtain and the other is a mechanical curtain.

20. The image processing apparatus according to claim 19, wherein the predetermined condition further includes a condition that a shutter speed of the shutter in the exposure is higher than a predetermined shutter speed and/or an F-number of the image pickup optical system in the exposure is smaller than a predetermined F-number.

* * * * *